US009310588B2

(12) United States Patent
Liao (10) Patent No.: US 9,310,588 B2
(45) Date of Patent: Apr. 12, 2016

(54) SIX-PIECE OPTICAL LENS FOR CAPTURING IMAGE AND SIX-PIECE OPTICAL MODULES FOR CAPTURING IMAGE (71) Applicant: ABILITY OPTO-ELECTRONICS TECHNOLOGY CO. LTD., Taichung County (TW)

(72) Inventor: Kuo-Yu Liao, Taichung (TW)

(73) Assignee: ABILITY OPTO-ELECTRONICS TECHNOLOGY CO. LTD., Taichung County (TW)

( * ) Notice: Subject to any disclaimer, the term of this patent is extended or adjusted under 35 U.S.C. 154(b) by 0 days.

(21) Appl. No.: 14/536,165

(22) Filed: Nov. 7, 2014

(65) Prior Publication Data

US 2015/0146086 A1 May 28, 2015

(30) Foreign Application Priority Data

Nov. 25, 2013 (TW) ............................... 102142783 A (51) Int. Cl.
*G02B 9/62* (2006.01)
*G02B 13/00* (2006.01)
(52) U.S. Cl.
CPC .............. *G02B 13/0045* (2013.01); *G02B 9/62* (2013.01)

(58) Field of Classification Search
CPC ............................. G02B 9/62; G02B 13/0045
See application file for complete search history.

(56) References Cited

U.S. PATENT DOCUMENTS 8,830,594 B1 * 9/2014 Hsu .................... G02B 13/0045
359/713

FOREIGN PATENT DOCUMENTS

TW          201312154 A      3/2013
TW          EP 2876478 A3 *  8/2015   ......... G02B 13/0045

* cited by examiner

*Primary Examiner* — David N Spector
(74) *Attorney, Agent, or Firm* — Muncy, Geissler, Olds & Lowe, P.C.

(57) ABSTRACT

The invention discloses a six-piece optical lens for capturing image and a six-piece optical module for capturing image. In order from an object side to an image side, the optical lens along the optical axis comprises a first lens element having a convex object-side surface and a convex image-side surface; a second lens element having a convex object-side surface and a concave image-side surface; a third lens element with positive refractive power having a convex object-side surface and a convex image-side surface; a fourth lens element with refractive power; a fifth lens element having a convex image-side surface; and a sixth lens element having a concave image-side; and at least one of the image-side surface and object-side surface of each of the six lens elements are aspheric. The optical lens can reduce the sensitivity for use in compact cameras with camera functionalities.

12 Claims, 9 Drawing Sheets

SIX-PIECE OPTICAL LENS FOR CAPTURING IMAGE AND SIX-PIECE OPTICAL MODULES FOR CAPTURING IMAGE

CROSS-REFERENCE TO RELATED APPLICATION

This application claims priority from Taiwan Patent Application No. 102142783, filed on Nov. 25, 2013, in the Taiwan Intellectual Property Office, the content of which are hereby incorporated by reference in their entirety for all purposes.

BACKGROUND OF THE INVENTION

1. Field of the Invention

The following description relates to a six-piece optical lens for capturing image and six-piece optical modules for capturing image, and more particularly to the optical lens for capturing image assembly comprised of a six-piece optical lens for capturing image and optical modules for capturing image thereof and be applied to 3C products.

2. Description of the Related Art

Presently, optical lenses for capturing image are usually disposed in the digital gadgets, such as cell phones, game consoles, PC CAM, DSC or DVD and so on, for capturing image of object, and as miniaturization and lower cost of optical lenses for capturing image have become a trend, capability of field curvature correction, high resolution and high imaging quality are necessary gradually.

As the conventional spherical polishing glass lenses, which are of more choices, and the glass lenses are advantageous to field curvature correction have been widely-used in the field, when smaller F Number and larger Wide-angle are applied to the spherical polishing glass lenses, it becomes harder to correct the field curvature, such as spherical aberration. In order to improve the shortcomings of the aforementioned traditional spherical polishing glass lenses, the current image capturing devices have used aspheric plastic lens or aspheric molding glass lens to acquire better imaging quality; nonetheless, structure of the preceding optical module for capturing image normally needs combination of more lenses so as to have better optical characteristic which results that the whole optical module for capturing image is oversized; consequently, the module is incapable of downsizing and having lower cost, for failing to meet the demand for miniaturization of electronic products.

As a result, how to reduce the total length of optical lens for capturing image and effectively combine sets of lenses so as to further promote the imaging quality has become an extremely crucial issue.

SUMMARY OF THE INVENTION

The aspect of embodiment of the present invention aims to an optical lens for capturing image and optical modules for capturing image which uses combination of refractive power, convex and concave surfaces of six-piece optical lenses to further shorten total length of optical lens for capturing image so as to increase imaging quality and be applied to minimized electronic products.

According to the aforementioned purpose, the present disclosure may provide six-piece optical lens for capturing image, in order from an object side to an image side, the optical lens along an optical axis comprising: a first lens element having a convex image-side surface and a convex object-side surface near the optical axis, wherein at least one of the object-side and the image-side surfaces of the first lens element may be aspheric; a second lens element having a concave image-side surface and a convex object-side surface near the optical axis, wherein at least one of the object-side and the image-side surfaces of the second lens element may be aspheric; a third lens element with positive refractive power having a convex object-side surface and a convex image-side surface near the optical axis, wherein at least one of the object-side and the image-side surfaces of the third lens element may be aspheric; a fourth lens element with refractive power near the optical axis, wherein at least one of the object-side and the image-side surfaces of the fourth lens element may be aspheric; a fifth lens element having a convex image-side surface near the optical axis, wherein at least one of the object-side and the image-side surfaces of the fifth lens element may be aspheric; and a sixth lens element having a concave image-side surface near the optical axis, wherein at least one of the object-side and the image-side surfaces of the sixth lens element may be aspheric.

Preferably, a focal length of the six-piece optical lens for capturing image may be f, a distance along the optical axis from the object-side surface of the first lens element to the image-side surface of the sixth lens element may be FL, and the following relationship may be satisfied: $0.7 < FL/f < 1.1$.

Preferably, a central thickness of the first lens element may be ct1, a central thickness of the third element lens may be ct3, and the following relationship may be satisfied: $0.5 < ct1/ct3 < 3$.

Preferably, a refractive index of the second lens element in spectrum 587.6 nm may be Nd2, a refractive index of the third lens element in spectrum 587.6 nm may be Nd3, an Abbe number of the second lens element in spectrum 587.6 nm may be Vd2, an Abbe number of the third lens element in spectrum 587.6 nm may be Vd3, and the following relationship may be satisfied: $Nd2 > 1.56$, $Nd3 < 1.56$, $Vd2 < 33$, $Vd3 > 33$.

Preferably, a central thickness of the sixth lens element may be ct6, a distance along the optical axis from the object-side surface of the first lens element to the image-side surface of the sixth lens element may be FL, and the following relationship may be satisfied: $0.05 < ct6/FL < 0.3$.

Preferably, a focal length of the six-piece optical lens for capturing image may be f, a curvature radius of the object-side surface of the first lens element near the optical axis may be R1, and the following relationship may be satisfied: $0.4 < R1/f < 0.6$.

Preferably, a diagonal line length of an image-plane for the max image-forming perspective view of the lens of the six-piece optical lens for capturing image may be Dg, a central thickness of the sixth lens element may be ct6, and the following relationship may be satisfied: $3 < Dg/ct6 < 20$.

According to the preceding purpose, the present disclosure may further provide a six-piece optical module for capturing image, in order from an object side to an image side, the optical lens along an optical axis comprising: a first lens element having a convex image-side surface and a convex object-side surface near the optical axis, wherein at least one of the object-side and the image-side surfaces of the first lens element may be aspheric; a second lens element having a concave image-side surface and a convex object-side surface near the optical axis, wherein at least one of the object-side and the image-side surfaces of the second lens element may be aspheric; a third lens element with positive refractive power having a convex object-side surface and a convex image-side surface near the optical axis, wherein at least one of the object-side and the image-side surfaces of the third lens element may be aspheric; a fourth lens element with refractive power near the optical axis, wherein at least one of the object-side and the image-side surfaces of the fourth lens element may be aspheric; a fifth lens element having a convex image-side surface near the optical axis, wherein at least one of the object-side and the image-side surfaces of the fifth lens element may be aspheric; and a sixth lens element having a concave image-side surface near the optical axis, wherein at least one of the object-side and the image-side surfaces of the sixth lens element may be aspheric; an image sensor disposed on an image-plane for imaging an object to be imaged; and an aperture stop disposed between the object and the second lens element.

Preferably, a focal length of the six-piece optical module for capturing image may be f, a distance along the optical axis from the object-side surface of the first lens element to the image-side surface of the sixth lens element may be FL, and the following relationship may be satisfied: 0.7<FL/f<1.1.

Preferably, a diagonal line length of an image-plane for the max image-forming perspective view of the lens of the six-piece optical module for capturing image may be Dg, and the following relationship may be satisfied: 0.4<FL/Dg<0.8.

Preferably, a central thickness of the first lens element may be ct1, a central thickness of the third lens element may be ct3, and the following relationship may be satisfied: 0.5<ct1/ct3<3.

Preferably, a refractive index of the second lens element in spectrum 587.6 nm may be Nd2, a refractive index of the third lens element in spectrum 587.6 nm may be Nd3, an Abbe number of the second lens element in spectrum 587.6 nm may be Vd2, an Abbe number of the third lens element in spectrum 587.6 nm may be Vd3, and the following relationship may be satisfied: Nd2>1.56, Nd3<1.56, Vd2<33, Vd3>33.

Preferably, a central thickness of the sixth lens element may be ct6, a distance along the optical axis from the object-side surface of the first lens element to the image-side surface of the sixth lens element may be FL, and the following relationship may be satisfied: 0.05<ct6/FL<0.3.

Preferably, a diagonal line length of an image-plane for the max image-forming perspective view of the lens of the six-piece optical lens for capturing image may be Dg, a central thickness of the sixth lens element may be ct6, and the following relationship may be satisfied: 3<Dg/ct6<20.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1A:
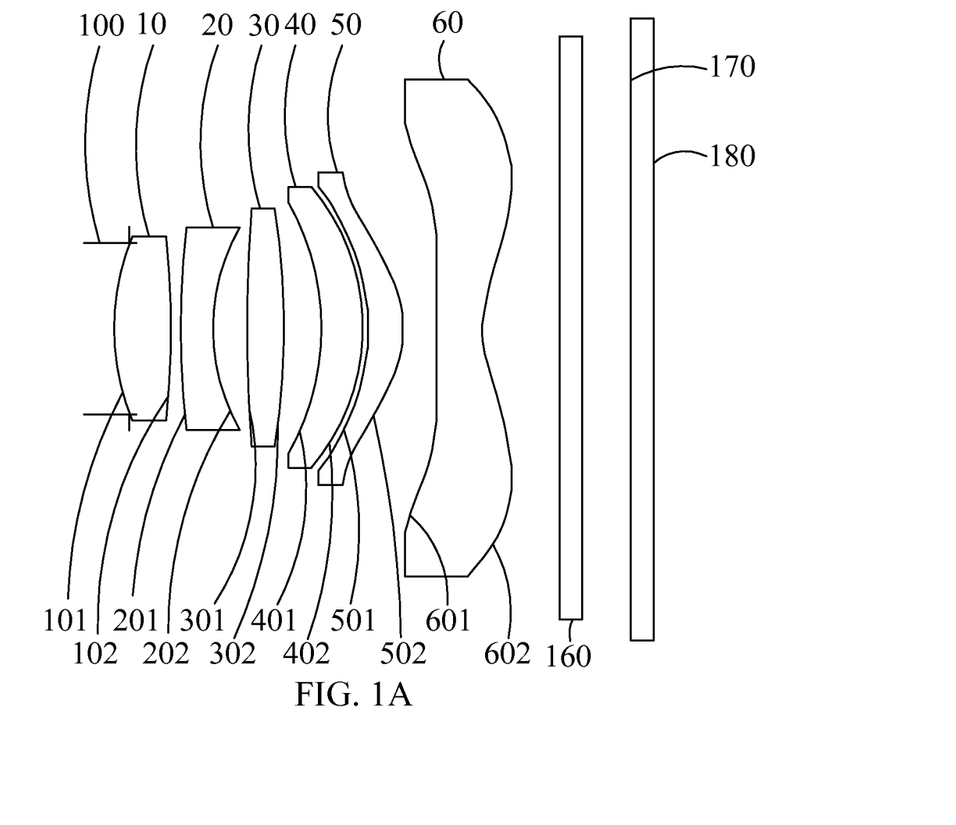
FIG. 1A is a schematic diagram of the first embodiment of a six-piece optical module for capturing image according to the present invention.

Please refer to FIG. 1A which is a schematic diagram of the first embodiment of a six-piece optical module for capturing image according to the present invention. As FIG. 1A shows, the present disclosure includes six-piece optical lens for capturing image, in order from an object side to an image side, the optical lens along an optical axis comprising: a first lens element 10, a second lens element 20, a third lens element 30, a fourth lens element 40, a fifth lens element 50 and a sixth lens element 60, wherein an object-side surface 101 of the first lens element and an image-side surface 102 of the first lens element are convex, at least one of the object-side surface 101 of the first lens element and the image-side surface 102 of the first lens element is aspheric; the second lens element having a concave image-side surface 202 and a convex object-side surface 201, wherein at least one of the object-side surface 201 and the image-side surface 202 is aspheric; the third lens element 30 with positive refractive power having a convex object-side surface 301 and a convex image-side surface 302, wherein at least one of the object-side 301 and the image-side 302 surfaces of the third lens element is aspheric; the fourth lens element 40 with refractive power, wherein at least one of the object-side 401 and the image-side 402 surfaces of the fourth lens element is aspheric; the fifth lens element having a convex image-side surface 502, wherein at least one of the object-side 501 and the image-side 502 surfaces of the fifth lens element is aspheric; the sixth lens element having a concave image-side surface 602, wherein at least one of the object-side 601 and the image-side 602 surfaces of the sixth lens element is aspheric.

The six-piece optical module for capturing image of the present disclosure further includes an aperture stop 100 and an IR filter 160. The aperture stop 100 which is disposed between the object and the first lens element 110 is a front stop. The IR filter 160 is disposed between the sixth lens element 60 and an image-plane 170, and the IR filter 160 is usually made of plate optical materials which does not affect the focal length of the six-piece optical module for capturing image of the present disclosure.

The six-piece optical module for capturing image of the present disclosure further includes an image sensor 180 disposed on the image-plane 170 for imaging an object to be imaged. The first 10, second 20, third 30, fourth 40, fifth 50 and sixth 60 lens elements includes a plastic material or a glass material, and the aspheric formula is: $z=ch^2/[1+[1-(k+1)c^2h^2]^{0.5}]+Ah^4+Bh^6+Ch^8+Dh^{10}+Eh^{12}+Fh^{14}+Gh^{16}+Hh^{18}+Jh^{20}+\ldots$, wherein z is a position of altitude h along the optical axis of which surface vertex is served as reference positional value; k is a conic constant, c is count of curvature radius and A, B, C, D, E, F, G and H are high order aspheric coefficients.

The optical statistic of the first embodiment is shown in Table 1, wherein the all of the object-side and the image-side surfaces of the first 10 to the sixth 60 lens elements are consisted of the aspheric formulas (1), and the aspheric coefficients are shown in Table 2, wherein the focal length of the six-piece optical lens for capturing image f=3.77 mm, the distance from the object-side surface of the first lens element to the image-side surface of the sixth lens element FL=3.365 mm, the diagonal line length of the image-plane for the max image-forming perspective view of the lens of the six-piece optical lens for capturing image Dg=5.712 mm, the central thickness of the first lens element ct1=0.525 mm, the central thickness of the third lens element ct3=0.339 mm, the central thickness of the sixth lens element ct6=0.40 mm, the curvature radius of the object-side surface of the first lens element near the optical axis R1=1.80 mm, ct6/FL=0.119, Dg/ct6=14.28, R1/f=0.477, FL/Dg=0.589, FL/f=0.893, ct1/ct3=1.549, the refractive index of the second lens element in spectrum 587.6 nm Nd2=1.640, the refractive index of the third lens element in spectrum 587.6 nm Nd3=1.535, an Abbe number of the second lens element in spectrum 587.6 nm Vd2=23.27 and an Abbe number of the third lens element in spectrum 587.6 nm Vd3=56.07.

TABLE 1

Basic lens element data of the first embodiment
Basic lens element data of the first embodiment

| Surface# | | Curvature radius (mm) | Thickness (mm) | Index (Nd) | Abbe# (Vd) |
|---|---|---|---|---|---|
| Aperture stop | | ∞ | −0.14 | | |
| First lens element | First Surface | 1.8 | 0.53 | 1.535 | 56.07 |
| | Second Surface | −18.7 | 0.08 | | |
| Second lens element | Third Surface | 3.6 | 0.30 | 1.640 | 23.27 |
| | Fourth Surface | 1.59 | 0.3 | | |
| Third lens element | Fifth Surface | 5.72 | 0.34 | 1.535 | 56.07 |
| | Sixth Surface | −18.5 | 0.35 | | |
| Fourth lens element | Seventh Surface | −1.89 | 0.37 | 1.535 | 56.07 |
| | Eighth Surface | −2.0 | 0.05 | | |
| Fifth lens element | Ninth Surface | −2.0 | 0.33 | 1.535 | 56.07 |
| | Tenth Surface | −0.9 | 0.3 | | |
| Sixth lens element | Eleventh Surface | 11.4 | 0.4 | 1.535 | 56.07 |
| | Twelfth Surface | 1.06 | 0.7 | | |
| Filter | Thirteen Surface | ∞ | 0.21 | 1.517 | 64.17 |
| | Fourteenth Surface | ∞ | 0.44 | | |

TABLE 2

Aspheric coefficients of the first embodiment

| | Surface# | | | | | |
|---|---|---|---|---|---|---|
| | 1 | 2 | 3 | 4 | 5 | 6 |
| k | −8.20 | 48.5 | −99.7 | −12.5 | −3.1 | −438 |
| A | 0.149 | −0.18 | −0.15 | 0.036 | −0.108 | −0.03 |
| B | −0.170 | 0.5298 | 0.4918 | 0.1332 | −0.062 | −0.086 |
| C | 0.213 | −0.85 | −0.570 | −0.041 | 0.143 | 0.0155 |
| D | −0.35 | 0.6399 | 0.1542 | −0.204 | 0.016 | 0.084 |
| E | 0.539 | −0.189 | 0.1659 | 0.3063 | −0.038 | −0.03 |
| F | −0.542 | −0.062 | −0.053 | −0.15 | 0 | 0 |
| G | 0.147 | 0.0669 | −0.024 | 0.023 | 0.0024 | 0.002 |
| H | 0.084 | 0 | 0 | 0 | 0 | 0 |
| J | 0 | 0 | 0 | 0 | 0 | 0 |

TABLE 2-continued

Aspheric coefficients of the first embodiment

| | Surface# | | | | | |
|---|---|---|---|---|---|---|
| | 7 | 8 | 9 | 10 | 11 | 12 |
| k | 1.3 | −0.01 | −0.12 | −3.2 | −46.2 | −6.6 |
| A | 0.104 | −0.0032 | 0.0041 | −0.050 | −0.051 | −0.068 |
| B | 0.0502 | 0.0035 | −8.2E−05 | 0.067 | −0.014 | 0.0216 |
| C | −0.20 | −0.0005 | 0.0003 | −0.078 | 0.009 | −0.007 |
| D | 0.274 | −0.0001 | 0.0001 | 0.0685 | −0.001 | 0.0017 |
| E | −0.153 | −5.0E−05 | 1.4E−05 | −0.023 | −0.0001 | −0.0002 |
| F | 0.0344 | 1.2E−05 | −2.0E−05 | 0.0022 | 2.1E−05 | 1.3E−05 |
| G | 0.0005 | 5.0E−05 | −2.0E−05 | 0.0001 | −5.9E−07 | −1.E−08 |
| H | 0 | 0 | 0 | 0 | 0 | 0 |
| J | 0 | 0 | 0 | 0 | 0 | 0 |

Figure 1B:
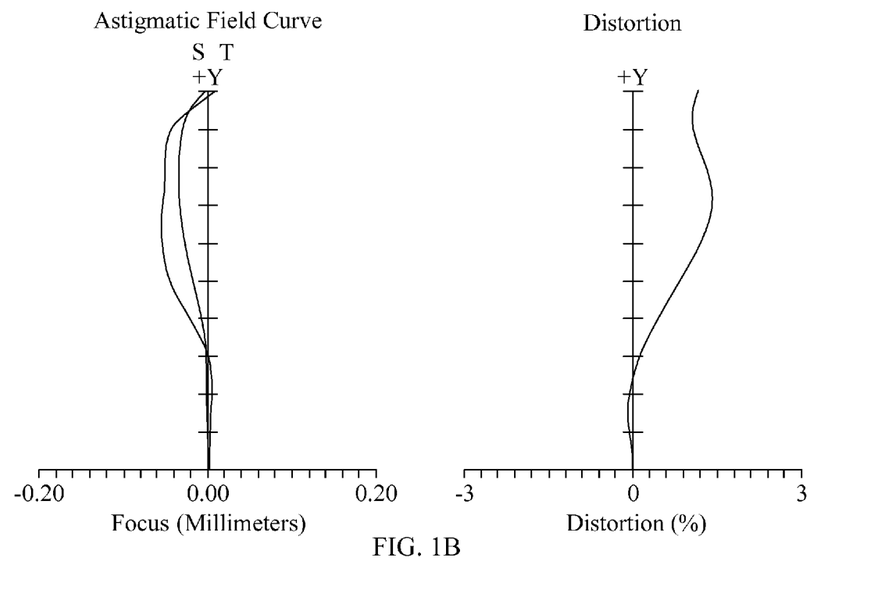
FIG. 1B is astigmatic field curves and a distortion curve of the first embodiment according to the present invention.
Figure 1C:
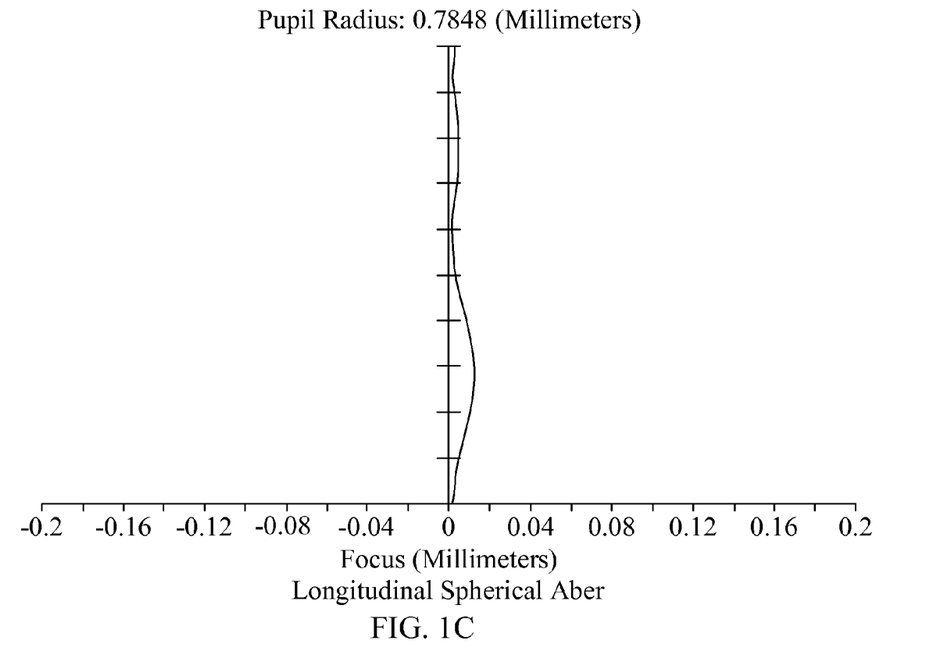
FIG. 1C is longitudinal spherical aberration curves of the first embodiment according to the present invention.

It can be found by the basic lens element data of table 1 along with the curve diagram of aberration of FIGS. 1B and 1C that it has better compensation effect upon the field curvature, distortion and longitudinal aberration by the embodiment of the six-piece optical module for capturing image according to the present invention.

Figure 2A:
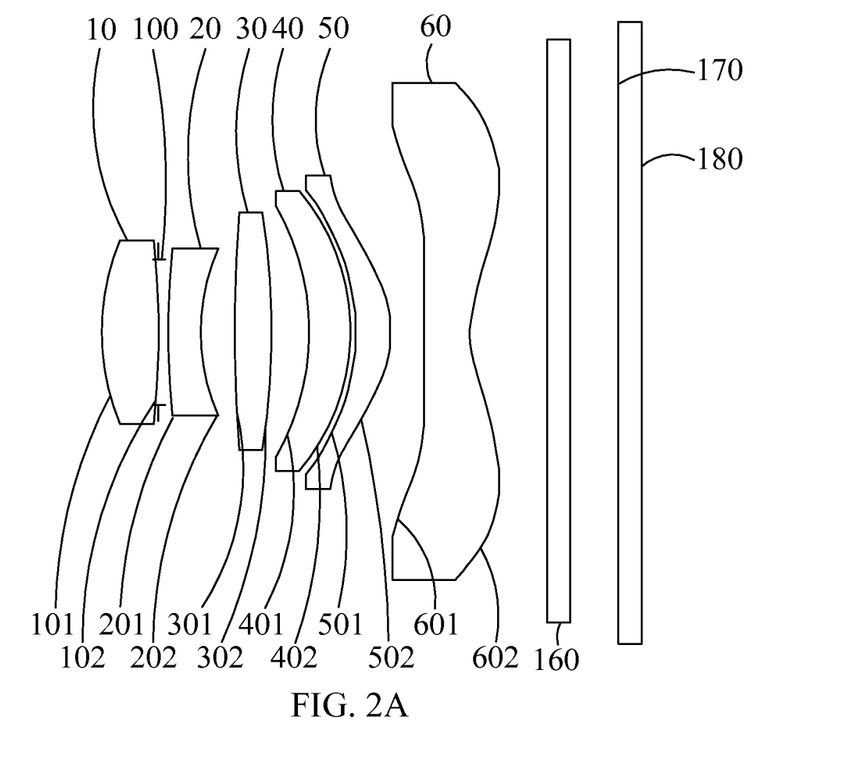
FIG. 2A is a schematic diagram of the second embodiment of a six-piece optical module for capturing image according to the present invention.

Please refer to FIG. 2A which is a schematic diagram of the second embodiment of a six-piece optical module for capturing image according to the present invention. As FIG. 2A shows, the present invention comprises a six-piece optical module for capturing image, in order from an object side to an image side, the optical lens along an optical axis comprising: a first lens element 10, a second lens element 20, a third lens element 30, a fourth lens element 40, a fifth lens element 50 and a sixth lens element 60, wherein an object-side surface 101 of the first lens element and an image-side surface 102 of the first lens element are convex, at least one of the object-side surface 101 of the first lens element and the image-side surface 102 of the first lens element is aspheric; the second lens element having a concave image-side surface 202 and a convex object-side surface 201, wherein at least one of the object-side surface 201 and the image-side surface 202 is aspheric; the third lens element 30 with positive refractive power having a convex object-side surface 301 and a convex image-side surface 302, wherein at least one of the object-side 301 and the image-side 302 surfaces of the third lens element is aspheric; the fourth lens element 40 with refractive power, wherein at least one of the object-side 401 and the image-side 402 surfaces of the fourth lens element is aspheric; the fifth lens element having a convex image-side surface 502, wherein at least one of the object-side 501 and the image-side 502 surfaces of the fifth lens element is aspheric; the sixth lens element having a concave image-side surface 602, wherein at least one of the object-side 601 and the image-side 602 surfaces of the sixth lens element is aspheric.

The six-piece optical module for capturing image of the present disclosure further includes an aperture stop 100 and an IR filter 160. The aperture stop 100 which is disposed between the object and the second lens element is a middle stop. The IR filter 160 is disposed between the sixth lens element 60 and an image-plane 170, and the IR filter 160 is usually made of plate optical materials which do not affect the focal length of the six-piece optical module for capturing image of the present disclosure.

The six-piece optical module for capturing image of the present invention further comprises an image sensor 180 disposed on the image-plane 170 for imaging an object to be imaged. The first 10, second 30, third 30, fourth 40, fifth 50 and sixth 60 lens elements comprise a plastic material or a glass substance.

The optical statistic of the second embodiment is shown in Table 3, wherein the all of the object-side and the image-side surfaces of the first 10 to the sixth 60 lens elements are consisted of the aspheric formulas (1), and the aspheric coefficients are shown in Table 4, wherein the focal length of the six-piece optical lens for capturing image f=3.76 mm, the distance from the object-side surface of the first lens element to the image-side surface of the sixth lens element FL=3.359 mm, the diagonal line length of the image-plane for the max image-forming perspective view of the lens of the six-piece optical lens for capturing image Dg=3.944 mm, the central thickness of the first lens element ct1=0.525 mm, the central thickness of the third lens element ct3=0.333 mm, the central thickness of the sixth lens element ct6=0.40 mm, the curvature radius of the object-side surface of the first lens element near the optical axis R1=1.80 mm, ct6/FL=0.119, Dg/ct6=9.86, R1/f=0.479, FL/Dg=0.588, FL/f=0.893, ct1/ct3=1.577, the refractive index of the second lens element in spectrum 587.6 nm Nd2=1.640, the refractive index of the third lens element in spectrum 587.6 nm Nd3=1.535, an Abbe number of the second lens element in spectrum 587.6 nm Vd2=23.27 and an Abbe number of the third lens element in spectrum 587.6 nm Vd3=56.07.

TABLE 3

Basic lens element data of the second embodiment
Basic lens element data of the second embodiment

| | Surface# | Curvature radius (mm) | Thickness (mm) | Index (Nd) | Abbe# (Vd) |
|---|---|---|---|---|---|
| First lens element | First Surface | 1.8 | 0.5 | 1.535 | 56.07 |
| | Second Surface | −18.0 | −0.006 | | |
| Aperture stop | | ∞ | 0.08 | | |
| Second lens element | Third Surface | 3.7 | 0.31 | 1.640 | 23.27 |
| | Fourth Surface | 1.5 | 0.31 | | |
| Third lens element | Fifth Surface | 5.6 | 0.33 | 1.535 | 56.07 |
| | Sixth Surface | −18.1 | 0.34 | | |
| Fourth lens element | Seventh Surface | −1.88 | 0.27 | 1.535 | 56.07 |
| | Eighth Surface | −2.01 | 0.05 | | |
| Fifth lens element | Ninth Surface | −2.13 | 0.42 | 1.535 | 56.07 |
| | Tenth Surface | −0.92 | 0.30 | | |
| Sixth lens element | Eleventh Surface | 12.3 | 0.40 | 1.535 | 56.07 |
| | Twelfth Surface | 1.09 | 0.70 | | |
| Filter | Thirteen Surface | ∞ | 0.21 | 1.517 | 64.17 |
| | Fourteenth Surface | ∞ | 0.43 | | |

TABLE 4

Aspheric coefficients of the second embodiment

| | Surface# | | | | | |
|---|---|---|---|---|---|---|
| | 1 | 2 | 3 | 4 | 5 | 6 |
| k | −8 | 100 | −106 | −12 | −0.4 | −264 |
| A | 0.149 | −0.18 | −0.153 | 0.035 | −0.107 | −0.030 |
| B | −0.17 | 0.529 | 0.488 | 0.131 | −0.061 | −0.086 |
| C | 0.214 | −0.84 | −0.57 | −0.042 | 0.142 | 0.015 |

TABLE 4-continued

Aspheric coefficients of the second embodiment

| D | −0.35 | 0.641 | 0.153 | −0.20 | 0.016 | 0.084 |
|---|---|---|---|---|---|---|
| E | 0.546 | −0.18 | 0.169 | 0.311 | −0.037 | −0.036 |
| F | −0.53 | −0.063 | −0.047 | −0.15 | 0 | 0 |
| G | 0.142 | 0.058 | 0.010 | 0.020 | 0.002 | 0.002 |
| H | 0.054 | 0 | 0 | 0 | 0 | 0 |
| J | 0 | 0 | 0 | 0 | 0 | 0 |

| | Surface# | | | | | |
|---|---|---|---|---|---|---|
| | 7 | 8 | 9 | 10 | 11 | 12 |
| k | 1.3 | −0.26 | −0.3 | −3.3 | −41 | −6.7 |
| A | 0.098 | 0.0084 | 0.0084 | −0.048 | −0.05 | −0.067 |
| B | 0.049 | 0.0054 | 0.0033 | 0.066 | −0.014 | 0.0216 |
| C | −0.20 | −7E−05 | 0.0012 | −0.07 | 0.0097 | −0.007 |
| D | 0.274 | 4E−05 | −7E−05 | 0.068 | −0.001 | 0.0017 |
| E | −0.153 | 5E−05 | −8E−05 | −0.023 | −0.0001 | −0.0002 |
| F | 0.0343 | 6E−05 | −4E−05 | 0.002 | 2.1E−05 | 1E−05 |
| G | 0.0003 | 8E−05 | −2E−05 | 0.00016 | −5.8E−07 | −1E−08 |
| H | 0 | 0 | 0 | 0 | 0 | 0 |
| J | 0 | 0 | 0 | 0 | 0 | 0 |

Figure 2B:
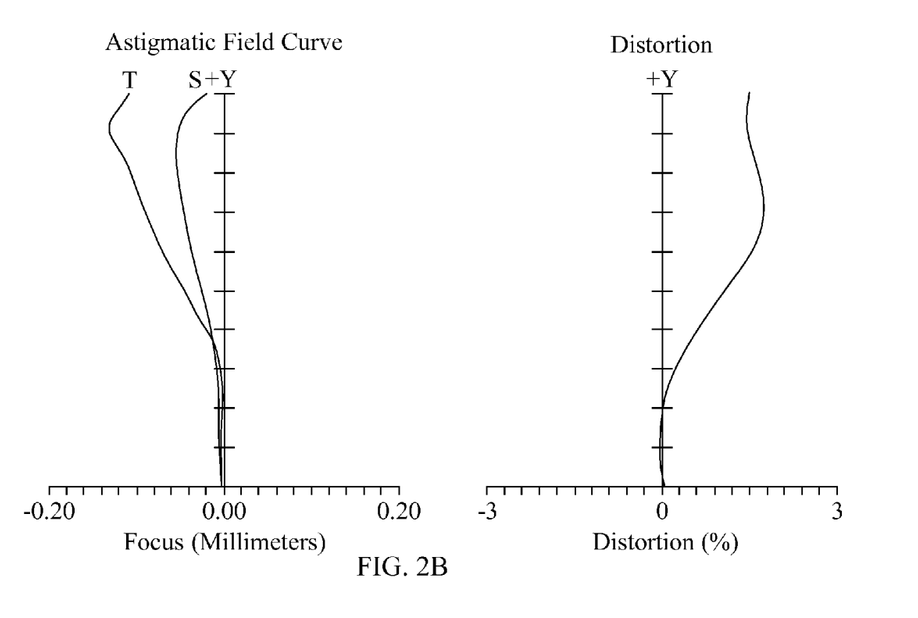
FIG. 2B is astigmatic field curves and a distortion curve of the second embodiment according to the present invention.
Figure 2C:
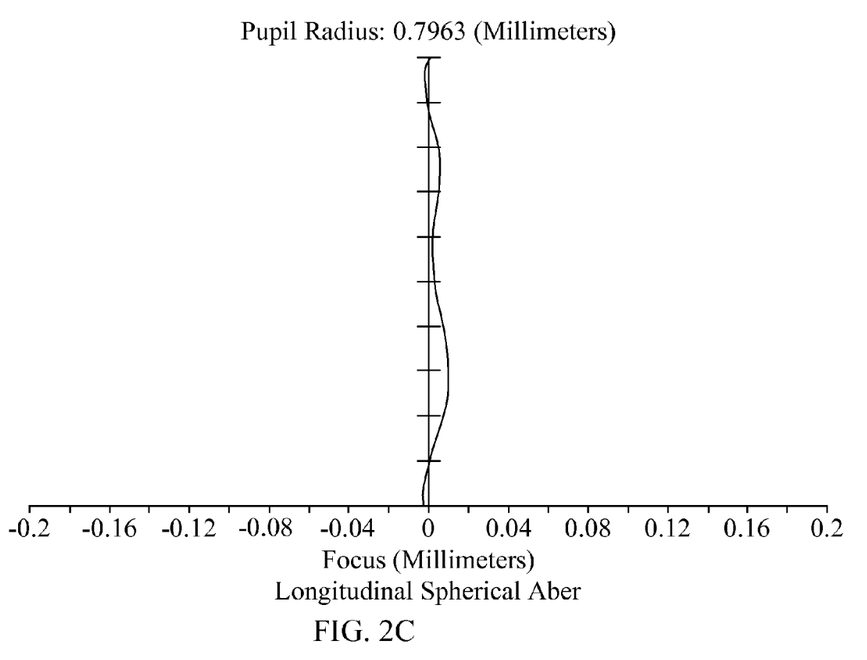
FIG. 2C is longitudinal spherical aberration curves of the second embodiment according to the present invention.

It can be found from the basic lens element data of table 3 along with the curve diagram of aberration of FIGS. 2B and 2C that it has better compensation effect upon the field curvature, distortion and longitudinal aberration by the embodiment of the six-piece optical module for capturing image according to the present disclosure.

Figure 3A:
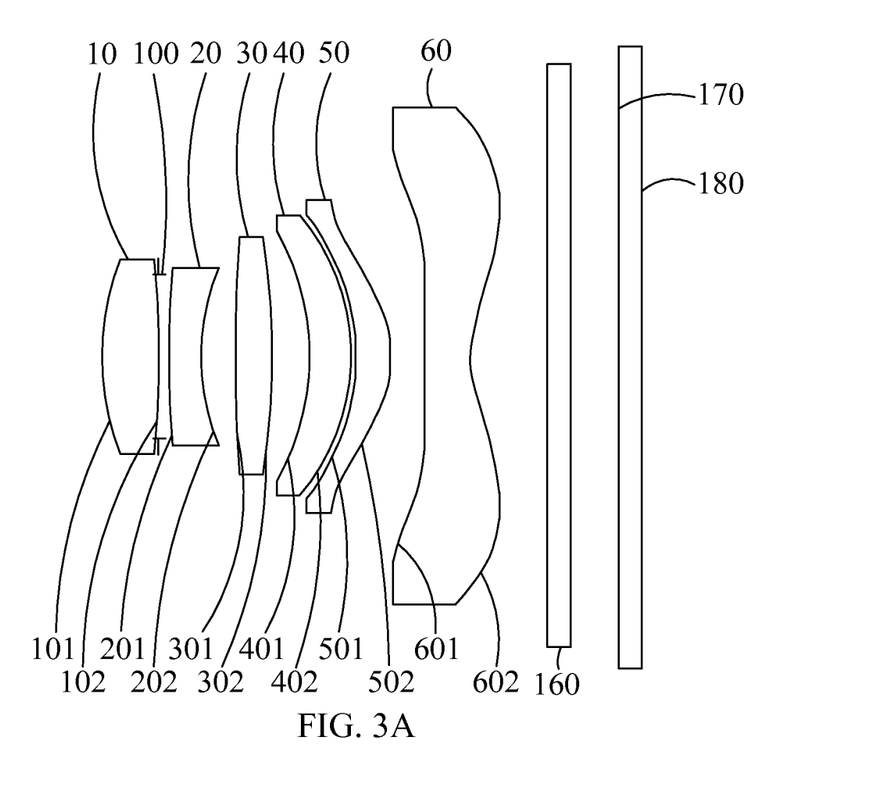
FIG. 3A is a schematic diagram of the third embodiment of a six-piece optical module for capturing image according to the present invention.

Please refer to FIG. 3A which is a schematic diagram of the third embodiment of a six-piece optical module for capturing image according to the present invention. As FIG. 3A shows, the present invention comprises a six-piece optical module for capturing image, in order from an object side to an image side, the optical lens along an optical axis comprising: a first lens element 10, a second lens element 20, a third lens element 30, a fourth lens element 40, a fifth lens element 50 and a sixth lens element 60, wherein an object-side surface 101 of the first lens element and an image-side surface 102 of the first lens element are convex, at least one of the object-side surface 101 of the first lens element and the image-side surface 102 of the first lens element is aspheric; the second lens element having a concave image-side surface 202 and a convex object-side surface 201, wherein at least one of the object-side surface 201 and the image-side surface 202 is aspheric; the third lens element 30 with positive refractive power having a convex object-side surface 301 and a convex image-side surface 302, wherein at least one of the object-side 301 and the image-side 302 surfaces of the third lens element is aspheric; the fourth lens element 40 with refractive power, wherein at least one of the object-side 401 and the image-side 402 surfaces of the fourth lens element is aspheric; the fifth lens element having a convex image-side surface 502, wherein at least one of the object-side 501 and the image-side 502 surfaces of the fifth lens element is aspheric; the sixth lens element having a concave image-side surface 602, wherein at least one of the object-side 601 and the image-side 602 surfaces of the sixth lens element is aspheric.

The six-piece optical module for capturing image of the present disclosure further includes an aperture stop 100 and an IR filter 160. The aperture stop 100 which is disposed between the object and the second lens element is a middle stop. The IR filter 160 is disposed between the sixth lens element 60 and an image-plane 170, and the IR filter 160 is usually made of plate optical materials which do not affect the focal length of the six-piece optical module for capturing image of the present disclosure.

The six-piece optical module for capturing image of the present disclosure further includes an image sensor 180 disposed on the image-plane 170 for imaging an object to be imaged. The first 10, second 30, third 30, fourth 40, fifth 50 and sixth 60 lens elements comprise a plastic material or a glass substance.

The optical statistic of the second embodiment is shown in Table 5, wherein the all of the object-side and the image-side surfaces of the first 10 to the sixth 60 lens elements are consisted of the aspheric formulas (1), and the aspheric coefficients are shown in Table 6, wherein the focal length of the six-piece optical lens for capturing image f=2.6 mm, the distance from the object-side surface of the first lens element to the image-side surface of the sixth lens element FL=2.318 mm, the diagonal line length of the image-plane for the max image-forming perspective view of the lens of the six-piece optical lens for capturing image Dg=3.944 mm, the central thickness of the first lens element ct1=0.362 mm, the central thickness of the third lens element ct3=0.230 mm, the central thickness of the sixth lens element ct6=0.27 mm, the curvature radius of the object-side surface of the first lens element near the optical axis R1=1.27 mm, ct6/FL=0.116, Dg/ct6=14.61, R1/f=0.488, FL/Dg=0.588, FL/f=0.891, ct1/ct3=1.574, the refractive index of the second lens element in spectrum 587.6 nm Nd2=1.640, the refractive index of the third lens element in spectrum 587.6 nm Nd3=1.535, an Abbe number of the second lens element in spectrum 587.6 nm Vd2=23.27 and an Abbe number of the third lens element in spectrum 587.6 nm Vd3=56.07.

TABLE 5

Basic lens element data of the third embodiment
Basic lens data of the third embodiment

| Surface# | | Curvature radius (mm) | Thickness (mm) | Index (Nd) | Abbe# (Vd) |
|---|---|---|---|---|---|
| First lens element | First Surface | 1.27 | 0.36 | 1.535 | 56.07 |
| | Second Surface | −12.4 | −0.004 | | |
| Aperture stop | | ∞ | 0.05 | | |
| Second lens element | Third Surface | 2.56 | 0.21 | 1.640 | 23.27 |
| | Fourth Surface | 1.09 | 0.21 | | |
| Third lens element | Fifth Surface | 3.9 | 0.23 | 1.535 | 56.07 |
| | Sixth Surface | −12.5 | 0.24 | | |
| Fourth lens element | Seventh Surface | −1.3 | 0.18 | 1.535 | 56.07 |
| | Eighth Surface | −1.3 | 0.03 | | |
| Fifth lens element | Ninth Surface | −1.4 | 0.29 | 1.535 | 56.07 |
| | Tenth Surface | −0.63 | 0.21 | | |
| Sixth lens element | Eleventh Surface | 8.49 | 0.27 | 1.535 | 56.07 |
| | Twelfth Surface | 0.75 | 0.48 | | |
| Filter | Thirteen Surface | ∞ | 0.14 | 1.517 | 64.17 |
| | Fourteenth Surface | ∞ | 0.29 | | |

TABLE 6

Aspheric coefficients of the third embodiment

| | Surface# | | | | | |
|---|---|---|---|---|---|---|
| | 1 | 2 | 3 | 4 | 5 | 6 |
| k | −8 | 100 | −106 | −12 | −0.4 | −264 |
| A | 0.103 | −0.553 | −0.46 | 0.108 | −0.32 | −0.091 |
| B | −0.11 | 3.374 | 3.11 | 0.84 | −0.39 | −0.54 |
| C | 0.147 | −11.3 | −7.67 | −0.56 | 1.908 | 0.212 |
| D | −0.24 | 17.9 | 4.30 | −5.69 | 0.449 | 2.37 |
| E | 0.377 | −11.06 | 9.96 | 18.3 | −2.22 | −2.16 |
| F | −0.37 | −7.81 | −5.8 | −18.7 | 0 | 0 |
| G | 0.09 | 15.1 | 2.72 | 5.39 | 0.67 | 0.58 |
| H | 0.037 | 0 | 0 | 0 | 0 | 0 |
| J | 0 | 0 | 0 | 0 | 0 | 0 |

| | Surface# | | | | | |
|---|---|---|---|---|---|---|
| | 7 | 8 | 9 | 1 | 11 | 12 |
| k | 1.3 | −0.2 | −0.3 | −3.3 | −41 | −6.7 |
| A | 0.30 | 0.025 | 0.02 | −0.14 | −0.15 | −0.20 |
| B | 0.313 | 0.034 | 0.021 | 0.42 | −0.09 | 0.13 |
| C | −2.67 | −0.001 | 0.016 | −1.05 | 0.13 | −0.103 |
| D | 7.69 | 0.0013 | −0.002 | 1.91 | −0.028 | 0.049 |
| E | −9.05 | 0.0034 | −0.005 | −1.40 | −0.006 | −0.013 |
| F | 4.241 | 0.0076 | −0.005 | 0.283 | 0.002 | 0.0016 |
| G | 0.10 | 0.021 | −0.005 | 0.041 | −0.0001 | −3E−06 |
| H | 0 | 0 | 0 | 0 | 0 | 0 |
| J | 0 | 0 | 0 | 0 | 0 | 0 |

Figure 3B:
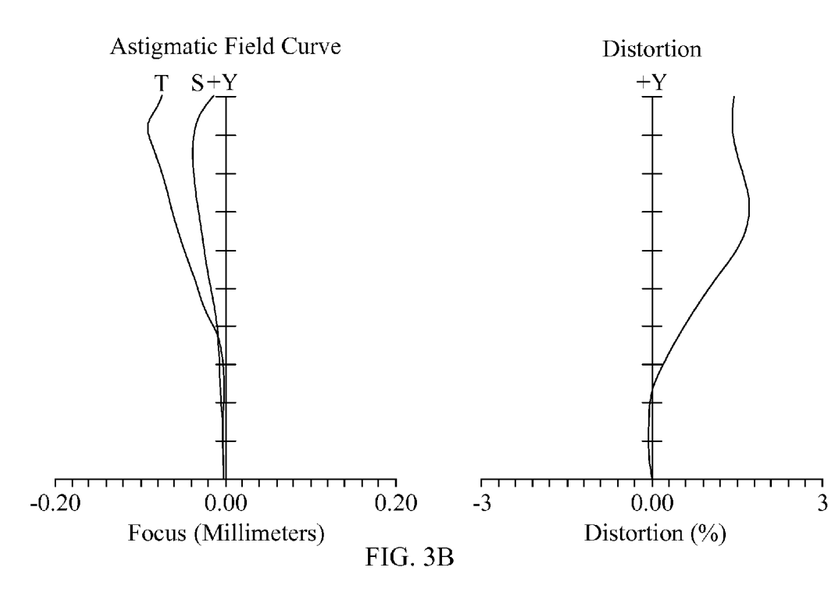
FIG. 3B is astigmatic field curves and a distortion curve of the third embodiment according to the present invention.
Figure 3C:
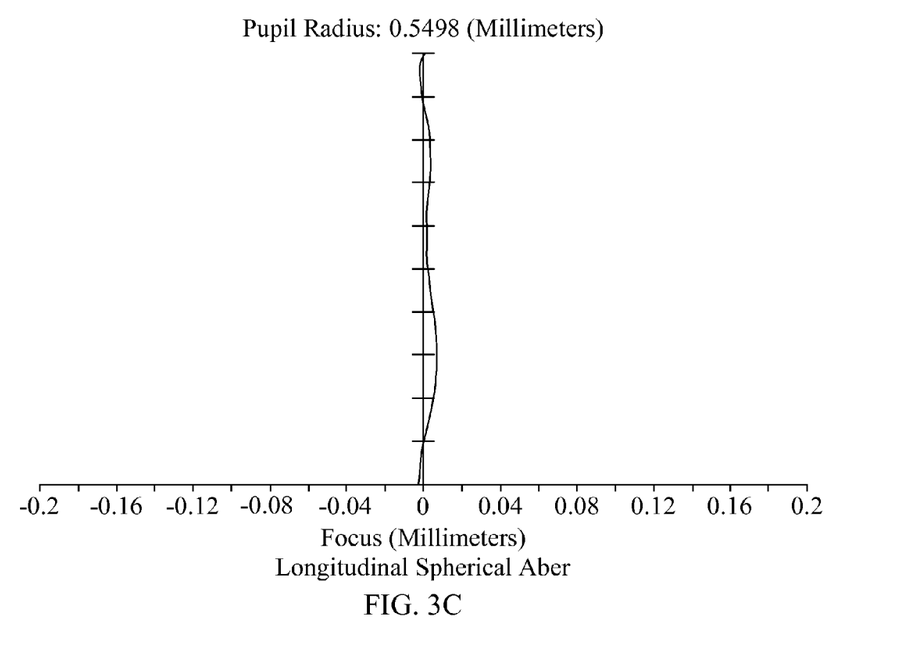
FIG. 3C is longitudinal spherical aberration curves of the third embodiment according to the present invention.

It can be found from the basic lens element data of table 5 along with the curve diagram of aberration of FIGS. 3B and 3C that it has better compensation effect upon the field curvature, distortion and longitudinal aberration by the embodiment of the six-piece optical module for capturing image according to the present disclosure.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A six-piece optical lens for capturing image, in order from an object side to an image side, the optical lens along an optical axis comprising:
    a first lens element having a convex image-side surface and a convex object-side surface near the optical axis, wherein at least one of the object-side and the image-side surfaces of the first lens element is aspheric;
    a second lens element having a concave image-side surface and a convex object-side surface near the optical axis, wherein at least one of the object-side and the image-side surfaces of the second lens element is aspheric;
    a third lens element with positive refractive power having a convex object-side surface and a convex image-side surface near the optical axis, wherein at least one of the object-side and the image-side surfaces of the third lens element is aspheric;
    a fourth lens element with refractive power near the optical axis, wherein at least one of the object-side and the image-side surfaces of the fourth lens element is aspheric;
    a fifth lens element having a convex image-side surface near the optical axis, wherein at least one of the object-side and the image-side surfaces of the fifth lens element is aspheric; and a sixth lens element having a concave image-side surface near the optical axis, wherein at least one of the object-side and the image-side surfaces of the sixth lens element is aspheric;

wherein a focal length of the six-piece optical lens for capturing image is f, a distance along the optical axis from the object-side surface of the first lens element to the image-side surface of the sixth lens element is FL, and the following relationship is satisfied: $0.7<FL/f<1.1$.

2. The six-piece optical lens for capturing image of claim 1, wherein a central thickness of the first lens element is ct1, a central thickness of the third element lens is ct3, and the following relationship is satisfied: $0.5<ct1/ct3<3$.

3. The six-piece optical lens for capturing image of claim 1, wherein a refractive index of the second lens element in spectrum 587.6 nm is Nd2, a refractive index of the third lens element in spectrum 587.6 nm is Nd3, an Abbe number of the second lens element in spectrum 587.6 nm is Vd2, an Abbe number of the third lens element in spectrum 587.6 nm is Vd3, and the following relationship is satisfied: $Nd2>1.56$, $Nd3<1.56$, $Vd2<33$, $Vd3>33$.

4. The six-piece optical lens for capturing image of claim 1, wherein a central thickness of the sixth lens element is ct6, a distance along the optical axis from the object-side surface of the first lens element to the image-side surface of the sixth lens element is FL, and the following relationship is satisfied: $0.05<ct6/FL<0.3$.

5. The six-piece optical lens for capturing image of claim 1, wherein a focal length of the six-piece optical lens for capturing image is f, a curvature radius of the object-side surface of the first lens element near the optical axis is R1, and the following relationship is satisfied: $0.4<R1/f<0.6$.

6. The six-piece optical lens for capturing image of claim 1, wherein a diagonal line length of an image-plane for the max image-forming perspective view of the lens of the six-piece optical lens for capturing image is Dg, a central thickness of the sixth lens element is ct6, and the following relationship is satisfied: $3<Dg/ct6<20$.

7. A six-piece optical module for capturing image, in order from an object side to an image side, the optical lens along an optical axis comprising:
a first lens element having a convex image-side surface and a convex object-side surface near the optical axis, wherein at least one of the object-side and the image-side surfaces of the first lens element is aspheric;
a second lens element having a concave image-side surface and a convex object-side surface near the optical axis, wherein at least one of the object-side and the image-side surfaces of the second lens element is aspheric;
a third lens element with positive refractive power having a convex object-side surface and a convex image-side surface near the optical axis, wherein at least one of the object-side and the image-side surfaces of the third lens element is aspheric;

a fourth lens element with refractive power near the optical axis, wherein at least one of the object-side and the image-side surfaces of the fourth lens element is aspheric;
a fifth lens element having a convex image-side surface near the optical axis, wherein at least one of the object-side and the image-side surfaces of the fifth lens element is aspheric; and
a sixth lens element having a concave image-side surface near the optical axis, wherein at least one of the object-side and the image-side surfaces of the sixth lens element is aspheric;
an image sensor disposed on an image-plane for imaging an object to be imaged; and
an aperture stop disposed between the object and the second lens element;
wherein a focal length of the six-piece optical module for capturing image is f, a distance along the optical axis from the object-side surface of the first lens element to the image-side surface of the sixth lens element is FL, and the following relationship is satisfied: $0.7<FL/f<1.1$.

8. The six-piece optical module for capturing image of claim 7, wherein a diagonal line length of an image-plane for the max image-forming perspective view of the lens of the six-piece optical module for capturing image is Dg, and the following relationship is satisfied: $0.4<FL/Dg<0.8$.

9. The six-piece optical module for capturing image of claim 7, wherein a central thickness of the first lens element is ct1, a central thickness of the third lens element is ct3, and the following relationship is satisfied: $0.5<ct1/ct3<3$.

10. The six-piece optical module for capturing image of claim 7, a refractive index of the second lens element in spectrum 587.6 nm is Nd2, a refractive index of the third lens element in spectrum 587.6 nm is Nd3, an Abbe number of the second lens element in spectrum 587.6 m nm is Vd2, an Abbe number of the third lens element in spectrum 587.6 nm is Vd3, and the following relationship is satisfied: $Nd2>1.56$, $Nd3<1.56$, $Vd2<33$, $Vd3>33$.

11. The six-piece optical module for capturing image of claim 7, wherein a central thickness of the sixth lens element is ct6, a distance along the optical axis from the object-side surface of the first lens element to the image-side surface of the sixth lens element is FL, and the following relationship is satisfied: $0.05<ct6/FL<0.3$.

12. The six-piece optical module for capturing image of claim 7, wherein a diagonal line length of an image-plane for the max image-forming perspective view of the lens of the six-piece optical lens for capturing image is Dg, a central thickness of the sixth lens element is ct6, and the following relationship is satisfied: $3<Dg/ct6<20$.

* * * * *